United States Patent [19]

Reinsma

[11] B 4,051,920
[45] Oct. 4, 1977

[54] METHOD AND APPARATUS FOR VACUUM EVACUATION AND PRESSURE FILLINGS OF SEALED PIN JOINTS

[75] Inventor: Harold L. Reinsma, Dunlap, Ill.

[73] Assignee: Caterpillar Tractor Company, Peoria, Ill.

[21] Appl. No.: 342,763

[22] Filed: Mar. 19, 1973

[44] Published under first Trial Voluntary Protest Program on Jan. 28, 1975 as document No. B 342,763

[51] Int. Cl. .............................................. F01m 11/04
[52] U.S. Cl. ...................................... 184/1 R; 141/7; 340/242; 184/6.4
[58] Field of Search ................ 141/7, 65, 67; 184/1.5, 184/1 R, 1 D, 15 R, 6.4, 1 C; 340/242 141/329, 66; 222/55

[56] References Cited

U.S. PATENT DOCUMENTS

| | | | |
|---|---|---|---|
| 2,366,845 | 1/1945 | Durham et al. | 222/55 |
| 2,631,437 | 3/1953 | Bruce et al. | 62/49 |
| 2,712,402 | 7/1955 | Le Clair | 141/329 |
| 2,750,581 | 6/1956 | Darian | 340/242 |
| 2,767,392 | 10/1956 | Szwargulski | 340/242 |
| 2,775,870 | 1/1957 | Bruce et al. | 62/49 |
| 2,791,244 | 5/1957 | Schlichten et al. | 141/7 |
| 3,216,527 | 11/1965 | Lewis | 184/1.5 |
| 3,788,519 | 1/1974 | Mengel | 141/329 |

OTHER PUBLICATIONS

Product Bulletins 103-A, 104-A, 105-A, 106-A, Production Control Units, Inc., 12/1966

Primary Examiner—Manuel A. Antonakas
Attorney, Agent, or Firm—Martin Majestic

[57] ABSTRACT

An apparatus and method for vacuum evacuation and pressure filling of a lubricant reservoir are provided which includes a sequence timing and shutoff mechanism for controlling evacuation, testing for air leaks, and filling with lubricant. Visual indication of mechanism performance is provided. A charging gun is adapted for sealingly mating with an opening in the reservoir. Alternatively, a pointed probe utilizable with stoppers of the conventional as well as vented type may be used.

3 Claims, 3 Drawing Figures

METHOD AND APPARATUS FOR VACUUM EVACUATION AND PRESSURE FILLING OF SEALED PIN JOINTS

CROSS-REFERENCE TO RELATED APPLICATION

This invention is suitable but not limited to use in filling pins having vented rubber plugs as disclosed in copending application Ser. No. 130,664, to Boggs, et al. now U.S. Pat. No. 3,762,778, issued on Oct. 2, 1973.

BACKGROUND OF THE INVENTION

This invention relates to a method and apparatus for vacuum evacuation and pressure filling of sealed pin joints with lubricant. More particularly, it is concerned with a method and apparatus providing a charging gun adapted to be manually positioned in communication with a chamber to be evacuated and a sequence timing and shutoff mechanism for controlling evacuation of the chamber and subsequent filling with lubricant. Vacuum checking for seal leakage prior to filling is also a provision of the system.

Many of the rotating and oscillating joints on earthmoving and industrial machinery are sealed and provided with a reservoir chamber to contain sufficient oil or other lubricant for extended periods of operation. Frequently, a portion of the reservoir chamber includes cavities closed by seals and bearings as well as the passages connecting such cavities with the chamber. One of the problems encountered with such joints has been the inability to completely fill the reservoir with oil due to air being trapped in inaccessible places.

Previous attempts to solve the problem thus posed have taken the form of pressure filling of and displacing air from the reservoir using complex bleed procedures. These have not always been entirely effective and satisfactory.

Another problem is that of checking the joints for undesirable leakage prior to filling. Faulty seals at the joints, for example, can cause not only wastage and early depletion of oil from the reservoir but also premature wearing due to foreign matter entering around the seals.

SUMMARY OF THE INVENTION

It is to a solution of these and other problems that this invention is directed. While this discussion is directed to filling of track pins found on track-type earthmoving machines, it is to be understood that the invention finds a wider application to filling of lubricant reservoirs in sealed joints.

The invention takes the form of an apparatus and method for filling a lubricant reservoir including a gun for engagement with an opening in the reservoir, a vacuum source for first evacuating the reservoir, a timing and shutoff mechanism for testing for air leaks, and a pressurized lubricant source for filling the reservoir if the leak test is passed. The gun has an elongated barrel having a seal for mating with the opening. Alternatively, it has an elongated, pointed probe for passing through a stopper of the conventional or vented types. Visual indicators are provided for denoting some of the steps.

DETAILED DESCRIPTION

Figure 1:
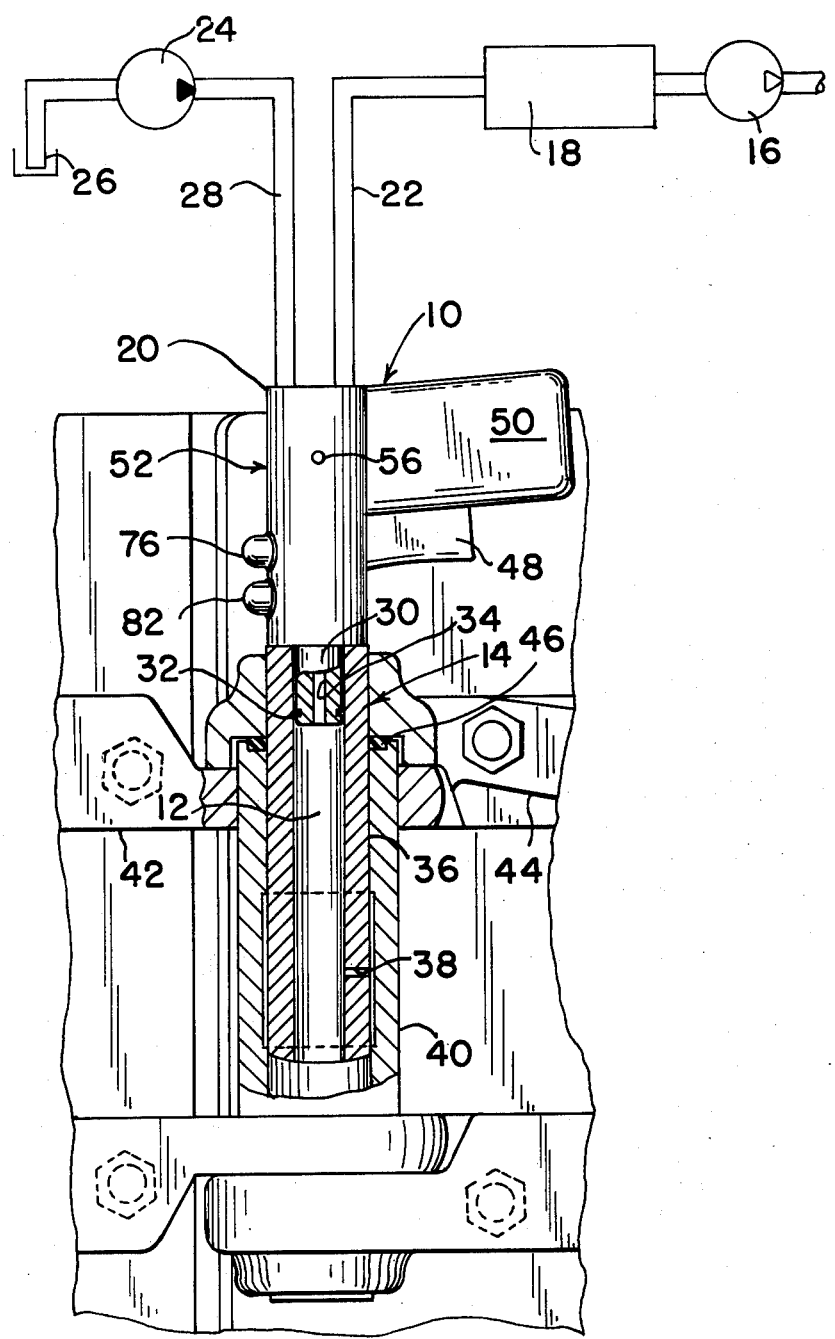
FIG. 1 is an overall view in partial cross section of the apparatus of this invention in operative position for filling an oil reservoir of a pin of a track assembly.

Referring to FIG. 1 of the drawings, an apparatus for vacuum evacuation and pressure filling of sealed joints with lubricant is generally indicated at 10 in position to fill an oil cavity or reservoir 12 of a track pin joint 14 which pivotally connects the links of a track assembly. The apparatus includes a vacuum pump 16 and a vacuum reservoir 18 in communication with a charging head or gun 20 through a flexible conduit 22. An oil pump 24 draws oil from a reservoir 26 and is in communication with the gun 20 through a flexible conduit 28.

The charging gun has a barrel 30 adapted for sealing engagement with the reservoir 12 by means of an annular O-ring seal 32 with the barrel having a passage 34 therethrough which opens into the reservoir. The reservoir is concentrically, axially disposed within pin 36 of the track assembly. The pin contains a radially directed lubricant passage 38 for communicating lubricant with the joint intermediate a track bushing 40. The track assembly further comprises a pair of track links 42, 44, and seals, one of which is shown at 46 for retaining lubricant. The gun is provided with a sequence start trigger 48 on a handgrip 50 with the trigger being operatively connected to a sequence timing and shutoff mechanism contained in the gun housing at 52.

Figure 2:
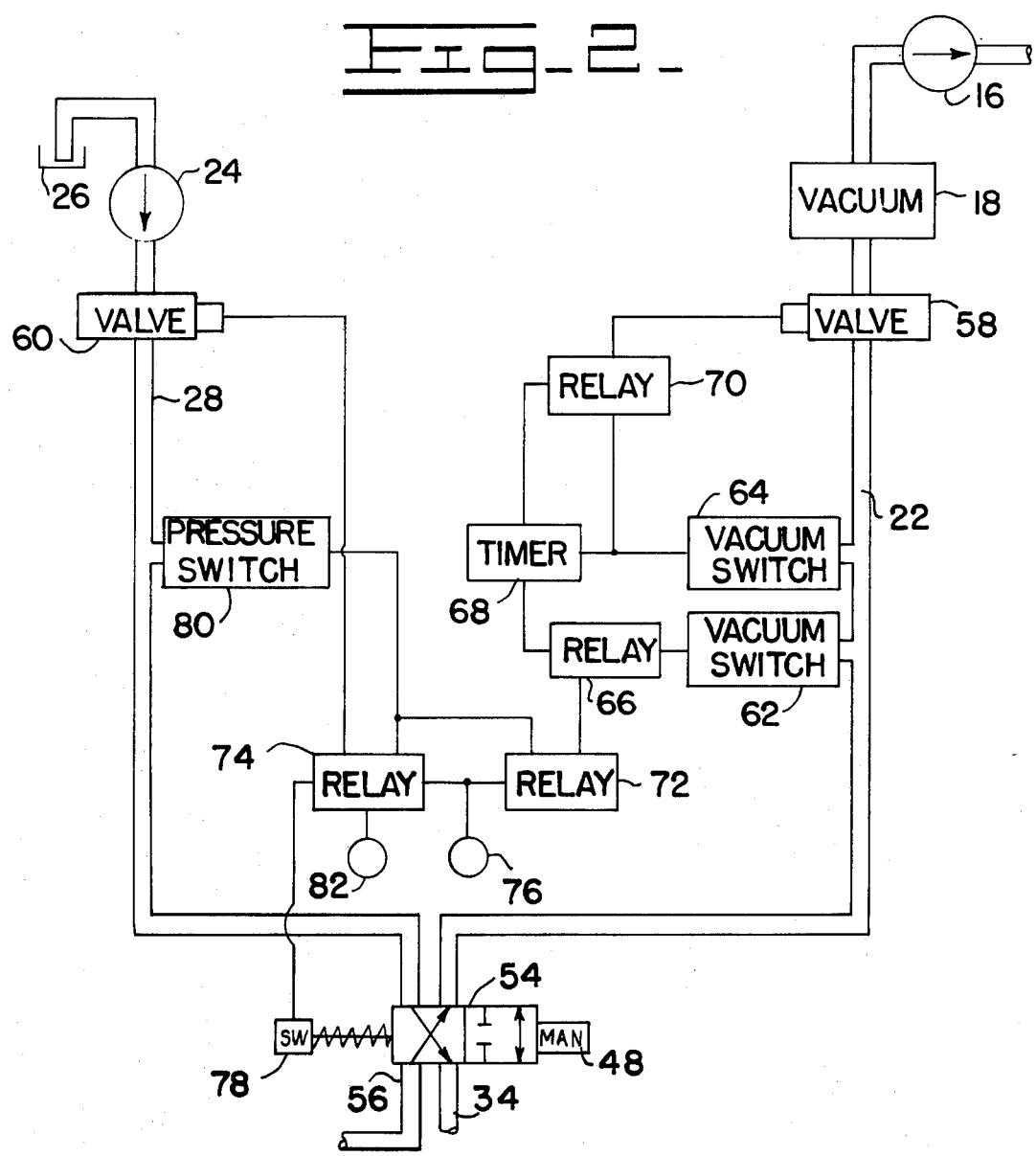
FIG. 2 is a schematic diagram of the sequence timing and shutoff mechanism of the invention.

The sequence timing and shutoff mechanism 52 is diagrammatically shown in FIG. 2 and includes a two-position manual valve 54 which is spring-biased to a normal or first position and is shown operatively connected to the sequence trigger switch 48 for actuation to a second position. With the valve in the first position, conduit 28 is in communication with passage 34 in the barrel while conduit 22 is open to the atmosphere through a vent passage 56 in the gun. Actuation of the valve to the second position connects conduit 22 with passage 34 while blocking conduit 28. A normally open, electrically actuated valve 58 is disposed in the conduit 22 between the vacuum reservoir 18 and the valve 54. A normally closed, electrically actuated valve 60 is disposed in the conduit 28 between the oil pump 24 and the valve 54.

As seen in FIGS. 1 and 2, the procedure for filling the pin reservoir 12 with oil is initiated by manually placing the barrel 30 of the gun 20 into the open end of the reservoir in sealing engagement by means of seal 32. The sequence start trigger 48 is actuated, shifting the valve 54 to the second position and thus evacuating the air from the pin cavity through passage 34 and conduit 22 by means of vacuum pump 16. The vacuum level in conduit 22 is sensed by a pair of vacuum actuated switches 62 and 64 connected to the conduit between the valves 54 and 58. When the vacuum level decreases to a first predetermined level (approximately 20 inHg), switch 62 closes and completes an electrical circuit to a relay 66.

If there are no large leaks in the pin joint, the vacuum level will decrease to a second predetermined level (approximately 27 inHg) causing switch 64 to close. Closing switch 64 directs a signal to energize a timer 68 and activate a latching relay 70. Latching relay 70 completes a circuit to the electrically actuated valve 58 causing it to shift to the closed position, blocking the vacuum conduit 22. At the end of the preset time interval, the timer emits a pulse signal simultaneously to activate relay 66 and deactivate the latching relay 70. If the vacuum level has remained above the vacuum setting of the vacuum switch 62, the switch will have remained closed and a circuit is completed from the switch through the relay 66 and to a second latching relay 72. The second latching relay 72 is activated by the signal from the relay 66 and, in turn, completes a circuit to a third latching relay 74 and turns a green indicator light 76. Deactivating the latching relay 70 also interrupts the circuit to the valve 58 allowing it to shift to the open position.

When the green light 76 is energized, the sequence trigger 48 is released, permitting the valve 54 to shift back to the first position whereby the oil conduit 28 is connected to the passage 34. The shifting of the valve to the first position also closes a switch 78 operatively connected to the valve and which, in turn, directs a signal to active the third latching relay 74. The third latching relay completes a circuit to the electrically actuated valve 60 causing it to shift to the open position allowing oil to flow from the oil pump 24 through the conduit 28 and the passage 34 of the gun and is injected into the pin cavity. When the pin cavity is filled with oil, the consequent pressure build-up in the conduit 28 reaches a predetermined level and actuates a pressure switch 80 which emits a pulse signal to deactivate relays 72 and 74. Deactivating relay 74 breaks the circuit to valve 60 permitting it to shift to the closed position to block the flow of oil from the pump. Deactivating relay 74 also causes a yellow indicator light 82 to be energized Deactivating relay 72 interrupts the circuit to the green light, de-energizing it to signal that the fill cycle has been completed. The gun barrel 30 is then removed from the pin reservoir and a rubber stopper (not shown) is inserted into the cavity.

A leak test sequence is also programmed into the fill procedure by the apparatus which prevents oil from being injected into the reservoir if a leak is detected. If a large leak exists in the joint, as would occur if a seal were inadvertently omitted during assembly, the vacuum level would not decrease sufficiently to cause either of the switches 62 or 64 to close and the green light would not be turned on thereby giving visual indication of the leak. To detect smaller leaks, the vacuum level in the pin reservoir and conduit 22 is reduced sufficiently to close both vacuum switches in sequence. As aforementioned, when switch 64 closes, the latching relay 70 is activated to close the valve 58, blocking the conduit and cavity from the vacuum reservoir. Closing switch 64 also starts the timer 68 which runs for a preselected time interval and then emits a pulse to activate the relay 66 and deactivate the latching relay 70. However, if there is a leak in the pin joint sufficient to drop the vacuum level below the setting of the vacuum switch 62 during the preselected time interval, the switch will open. With switch 62 open, the circuit to the relay 66 is broken and, consequently, the relay 72 will not be activated so that no signal is directed to the green light or the relay 74. When the green light does not flash on within a short time, the operator will have indication that the joint has a leak and will release the sequence start trigger and move the gun to another joint. With no current present at relay 74, the consequent closing of switch 78 has no effect on the oil fill sequence. The rubber plugs employed for sealing the cavity can be either a solid plug or a vented plug as disclosed in cross-referenced U.S. Pat. No. 3,762,778.

Figure 3:
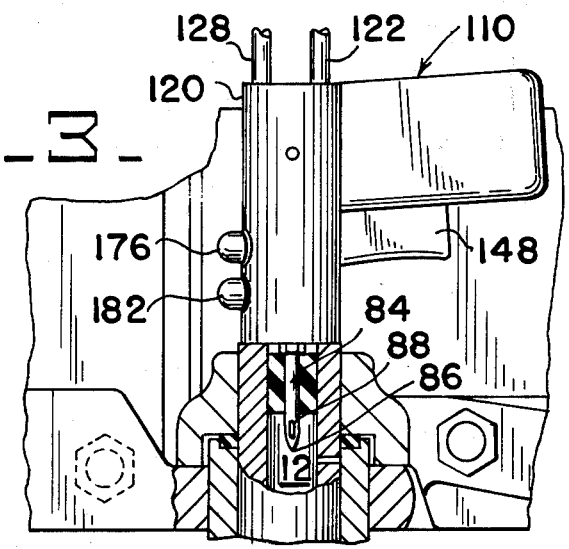
FIG. 3 is an alternate embodiment of the gun part of the apparatus of FIG. 1 shown in operative position.

An alternate embodiment of the gun is shown in FIG. 3 wherein the barrel is replaced with a long, relatively thin, hollow probe 84 having its distal end terminating in a point 86. The hollow probe is connected to passage 34 and has a pair of discharge ports 88 extending through the wall of the probe adjacent to the point 86. The alternate embodiment structure finding its analogous counterpart in the preferred embodiment is preceded by a 1.

The alternate embodiment is intended primarily as a field service tool for refilling the pin cavities on vehicles at the job site. Depending upon the type of plug which was initially used to seal the pin reservoir, the hollow probe is either forced through the solid rubber plug or through the vent passage of the vented plugs during the refilling operation. Both embodiments utilize the same sequence timing and shutoff mechanism.

It is to be understood that the foregoing description is merely illustrative of preferred embodiment of the invention and that the scope of the invention is not to be limited thereto, but is to be determined by the scope of the appended claims.

What is claimed is:

1. An apparatus for filling a lubricant reservoir comprising:
    gun means adapted for sealing engagement with an opening of the lubricant reservoir,
    a source of vacuum,
    a source of lubricant, and
    sequence timing and shutoff means for first intercommunicating said vacuum source with said lubricant reservoir by way of said gun to evacuate said lubricant reservoir and then intercommunicating said lubricant source with said lubricant reservoir to fill said lubricant reservoir with lubricant,
    wherein the sequence timing and shutoff means comprise timing means actuatable upon evacuation of the lubricant reservoir to a certain level, and indicator means operatively coupled with said timing means for indicating that evacuation of the reservoir has been held at a level relative to said certain level for a given time.

2. The apparatus of claim 1 and means for preventing intercommunication with the lubricant source upon the indicator means indicating that the evacuation of the reservoir has fallen below said level relative to said certain level within said given time.

3. The apparatus of claim 2 wherein the indicator means comprise light means.

* * * * *